(12) United States Patent
Terricciano et al.

(10) Patent No.: US 8,319,372 B2
(45) Date of Patent: Nov. 27, 2012

(54) EIB PROTOCOL IN AN INTEGRATED POWER DISTRIBUTION SYSTEM

(75) Inventors: Paul Terricciano, Roswell, GA (US); Seshagiri R Marellapudi, Norcross, GA (US); David M Williams, Alpharetta, GA (US); Ravikumar Balasubramaniam, Alpharetta, GA (US)

(73) Assignee: Siemens Industry, Inc., Alpharetta, GA (US)

( * ) Notice: Subject to any disclaimer, the term of this patent is extended or adjusted under 35 U.S.C. 154(b) by 1602 days.

(21) Appl. No.: 11/635,298

(22) Filed: Dec. 7, 2006

(65) Prior Publication Data

US 2008/0084116 A1 Apr. 10, 2008

Related U.S. Application Data

(60) Provisional application No. 60/826,558, filed on Sep. 22, 2006.

(51) Int. Cl.
*H02J 3/00* (2006.01)
*H02J 3/14* (2006.01)
*G06F 15/16* (2006.01)

(52) U.S. Cl. .......................... 307/39; 709/230
(58) Field of Classification Search .................... 307/39; 709/230
See application file for complete search history.

(56) References Cited

U.S. PATENT DOCUMENTS

| | | | |
|---|---|---|---|
| 6,658,480 B2 * | 12/2003 | Boucher et al. | 709/239 |
| 2003/0205938 A1 * | 11/2003 | Andarawis et al. | 307/11 |
| 2009/0247120 A1 * | 10/2009 | Heutschi et al. | 455/406 |

* cited by examiner

*Primary Examiner* — Rexford Barnie
*Assistant Examiner* — Dru Parries

(57) ABSTRACT

An electrical distribution system for selectively connecting an electrical power source to load devices comprises a plurality of panels. Each panel comprises a plurality of load control devices each for connection in a branch circuit to a load device, and an input/output (I/O) controller operatively connected to each of the load control devices for controlling operation of the load control devices. The I/O controller includes a communication port. A programmed system controller is provided for commanding operation of the I/O controllers and includes a communication port. A bus operatively connects the I/O controller communication ports to the system controller communication port. The programmed system controller implements a communication program using a protocol establishing communications on the bus, the protocol including a layer stack translating between logical messages and physical messages for communication on the bus, wherein each layer generates its own thread and communicates to other layers via objects passed in queues to adjacent layers.

21 Claims, 9 Drawing Sheets

| LAYER | AVAILABLE SERVICES |
|---|---|
| 7 | COMMUNICATION OBJECTS, TRANSPARENT DATA TRANSMISSION READ / WRITE, (ACCESS SECURITY) |
| 6 | |
| 5 | |
| 4 | ACKNOWLEDGEMENT, POINT-TO-POINT / GROUP ADDRESSING, REPETITION CONTROL, SEQUENCE COUNTER. |
| 3 | ROUTING, DETECTION OF LINE LOOPS. |
| 2 | FRAMING, CHARACTER CODING / DECODING, BLOCK CHECK, CSMA/CA, PRIORITIES, ADDRESSING, ERROR DETECTION |
| 1 | MEDIA SPECIFIC INTERFACE AND SIGNAL DEFINITION, EMC SPECIFICATION, CONNECTORS |

*Fig. 6*

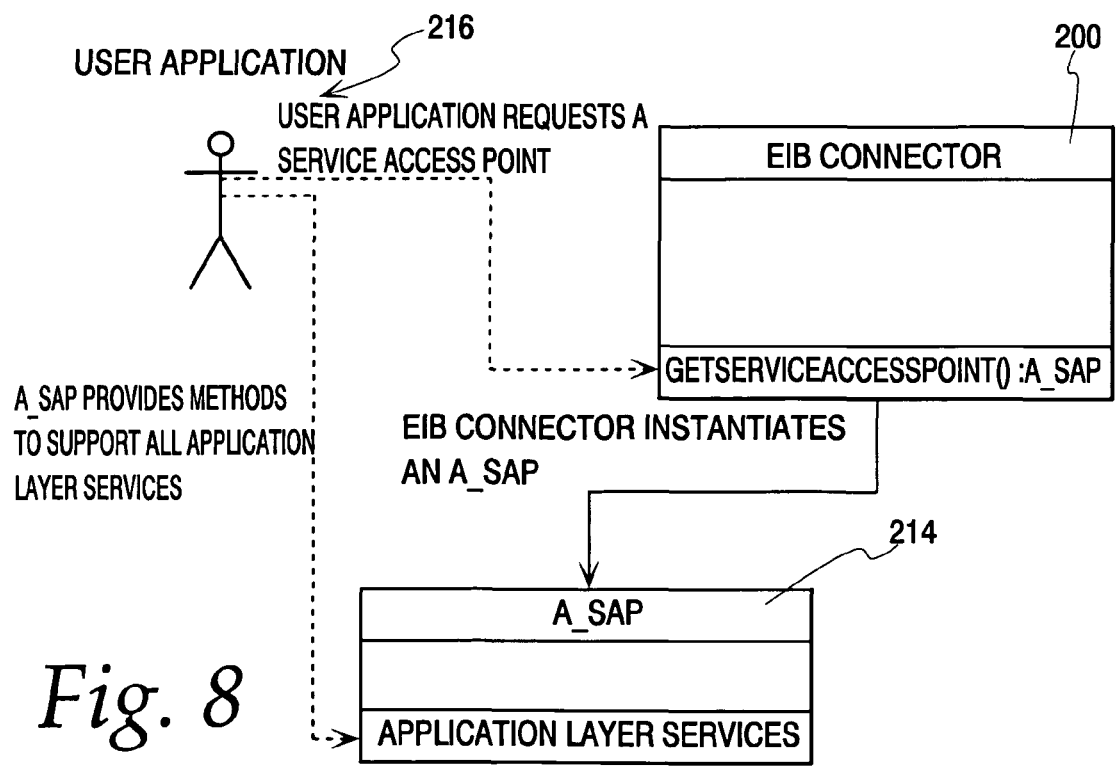

*Fig. 8*

EIB PROTOCOL IN AN INTEGRATED POWER DISTRIBUTION SYSTEM

CROSS REFERENCE TO RELATED APPLICATIONS

This application claims priority of provisional application No. 60/826,558 filed Sep. 22, 2006, the contents of which is incorporated by reference herein.

FIELD OF THE INVENTION

This invention relates generally to residential and commercial electrical power distribution panels and components, and more particularly, to EIB protocol for integrated distribution panels in an electrical power distribution system.

BACKGROUND OF THE INVENTION

Circuit breaker panels are used to protect electrical circuitry from damage due to an overcurrent condition, such as an overload, a relatively high level short circuit, or a ground fault condition. To perform that function, circuit breaker panels include circuit breakers that typically contain a switch unit and a trip unit. The switch unit is coupled to the electrical circuitry (i.e., lines and loads) such that it can open or close the electrical path of the electrical circuitry. The switch unit includes a pair of separable contacts per phase, a pivoting contact arm per phase, an operating mechanism, and an operating handle.

In the overcurrent condition, all the pairs of separable contacts are disengaged or tripped, opening the electrical circuitry. When the overcurrent condition is no longer present, the circuit breaker can be reset such that all the pairs of separable contacts are engaged, closing the electrical circuitry.

In addition to manual overcurrent protection via the operating handle, automatic overcurrent protection is also provided via the trip unit. The trip unit, coupled to the switch unit, senses the electrical circuitry for the overcurrent condition and automatically trips the circuit breaker. When the overcurrent condition is sensed, a tripping mechanism included in the trip unit actuates the operating mechanism, thereby disengaging the first contact from the second contact for each phase. Typically, the operating handle is coupled to the operating mechanism such that when the tripping mechanism actuates the operating mechanism to separate the contacts, the operating handle also moves to a tripped position.

Switchgear and switchboard are general terms used to refer to electrical equipment including metal enclosures that house switching and interrupting devices such as fuses, circuit breakers and relays, along with associated control, instrumentation and metering devices. The enclosures also typically include devices such as bus bars, inner connections and supporting structures (referred to generally herein as "panels") used for the distribution of electrical power. Such electrical equipment can be maintained in a building such as a factory or commercial establishment, or it can be maintained outside of such facilities and exposed to environmental weather conditions. Typically, hinge doors or covers are provided on the front of the switchgear or switchboard sections for access to the devices contained therein.

In addition to electrical distribution and the protection of circuitry from overcurrent conditions, components have been added to panels for the control of electrical power to loads connected to circuit breakers. For example, components have been used to control electrical power for lighting.

One system used for controlling electrical power to loads utilizes a remote-operated circuit breaker system. In such a system, the switch unit of the circuit breaker operates not only in response to an overcurrent condition, but also in response to a signal received from a control unit separate from the circuit breaker. The circuit breaker is specially constructed for use as a remote-operated circuit breaker, and contains a motor for actuating the switch unit.

In an exemplary remote-operated circuit breaker system, a control unit is installed on the panel and is hard-wired to the remote-operated circuit breaker through a control bus. When the switch unit of the circuit breaker is to be closed or opened, an operating current is applied to or removed from the circuit breaker motor directly by the control panel. Additional, separate conductors are provided in the bus for feedback information such as contact confirmation, etc., for each circuit breaker position in the panel. The control unit contains electronics for separately applying and removing the operating current to the circuit breakers installed in particular circuit breaker positions in the panel. The panel control unit also has electronics for checking the state of the circuit breaker, diagnostics, etc. One advantage of that system is that the individual circuit breakers can be addressed according to their positions in the panel.

Typically, a power distribution system such as a lighting control panel includes local control of the individual switch units. In a stand alone system, a control module is incorporated in the panel for controlling the individual switch devices. With a plurality of panels, such systems may use a single control module for the plurality of panels. This presents a need to have efficient communications from the single control module to the individual panels.

The present invention is directed to improvements in multipanel electrical distribution systems, such as lighting control panels.

SUMMARY OF THE INVENTION

In accordance with the invention, there is provided an electrical distribution system including EIB protocol for integrated distribution panels.

There is disclosed in accordance with one aspect of the invention a method of communicating messages in an integrated power distribution system, comprising: providing a panel comprising a plurality of load control devices each for connection in a branch circuit to a load, and an I/O controller operatively connected to each of the load control devices, the I/O controller comprising a controller for controlling operation of the load control devices and a communication port for message communication; providing a programmed system controller for controlling operation of the I/O controller and including a communication port for message communication; operatively connecting the I/O controller communication port to the system controller communication port via a bus; and the system controller implementing a protocol establishing communications on the bus, the protocol including a layer stack translating between logical messages and physical messages for communication on the bus, wherein each layer generates its own thread and communicates to other layers via objects passed in queues to adjacent layers.

It is a feature of the invention that the layer stack comprises an application layer, a transport layer, a network layer and a link layer.

It is another feature of the invention that the layer stack comprises an application layer which is adjacent a transport layer which is adjacent a network layer and which is adjacent a link layer.

It is a further feature of the invention that the layer stack comprises an application layer providing an interface to user applications.

It is an additional feature of the invention that the layer stack comprises a transport layer providing data transmission over different communication modes. The communication modes may comprise: point-to-multipoint, connection-less (multicast); point-to-all-points, connection-less (broadcast); point-to-point, connection-less; and point-to-point, connection-oriented.

It is still another feature of the invention that the layer stack comprises a link layer for coding and decoding messages to and form the bus. The link layer may communicate with the bus through a serial interface driver.

There is disclosed in accordance with another aspect of the invention a method of communicating messages in an integrated power distribution system, comprising: providing a plurality of panels, each panel comprising a plurality of load control devices each for connection in a branch circuit to a load, and an I/O controller operatively connected to each of the load control devices, the I/O controller comprising a controller for controlling operation of the load control devices and a communication port for message communication; providing a programmed system controller for controlling operation of the I/O controllers and including a communication port for message communication; operatively connecting the I/O controller communication ports to the system controller communication port via a bus; and the system controller implementing a protocol establishing communications on the bus, the protocol including a layer stack translating between logical messages and physical messages for communication on the bus, wherein each layer generates its own thread and communicates to other layers via objects passed in queues to adjacent layers.

There is disclosed in accordance with yet another aspect of the an electrical distribution system for selectively connecting an electrical power source to load devices, comprising a plurality of panels. Each panel comprises a plurality of load control devices for connection in a branch circuit to a load device, and an input/output (I/O) controller operatively connected to each of the load control devices for controlling operation of the load control devices. The I/O controller includes a communication port. A programmed system controller is provided for commanding operation of the I/O controllers and includes a communication port. A bus operatively connects the I/O controller communication ports to the system controller communication port. The programmed system controller implements a communication program using a protocol establishing communications on the bus, the protocol including a layer stack translating between logical messages and physical messages for communication on the bus, wherein each layer generates its own thread and communicates to other layers via objects passed in queues to adjacent layers.

Further features and advantages of the invention will be readily apparent from the specification and from the drawings.

BRIEF DESCRIPTION OF THE DRAWINGS

FIG. 6 is an illustration of the layers implemented in an EIB stack in accordance with the invention;

FIG. 8 is a flow diagram illustrating how an application is provided EIB services;

DETAILED DESCRIPTION OF THE INVENTION

An electrical distribution system, such as an integrated lighting control system, in accordance with the invention permits a user to control power circuits typically used for lighting, as well as circuits for resistive heating or air conditioning, using EIB protocol for integrated distribution panels in an electrical power distribution system. Control may include on/off switching, dimming and metering. The electrical distribution system may be as is generally described in U.S. application Ser. No. 11/519,727, filed Sep. 12, 2006, the specification of which is incorporated by reference herein.

Figure 1:
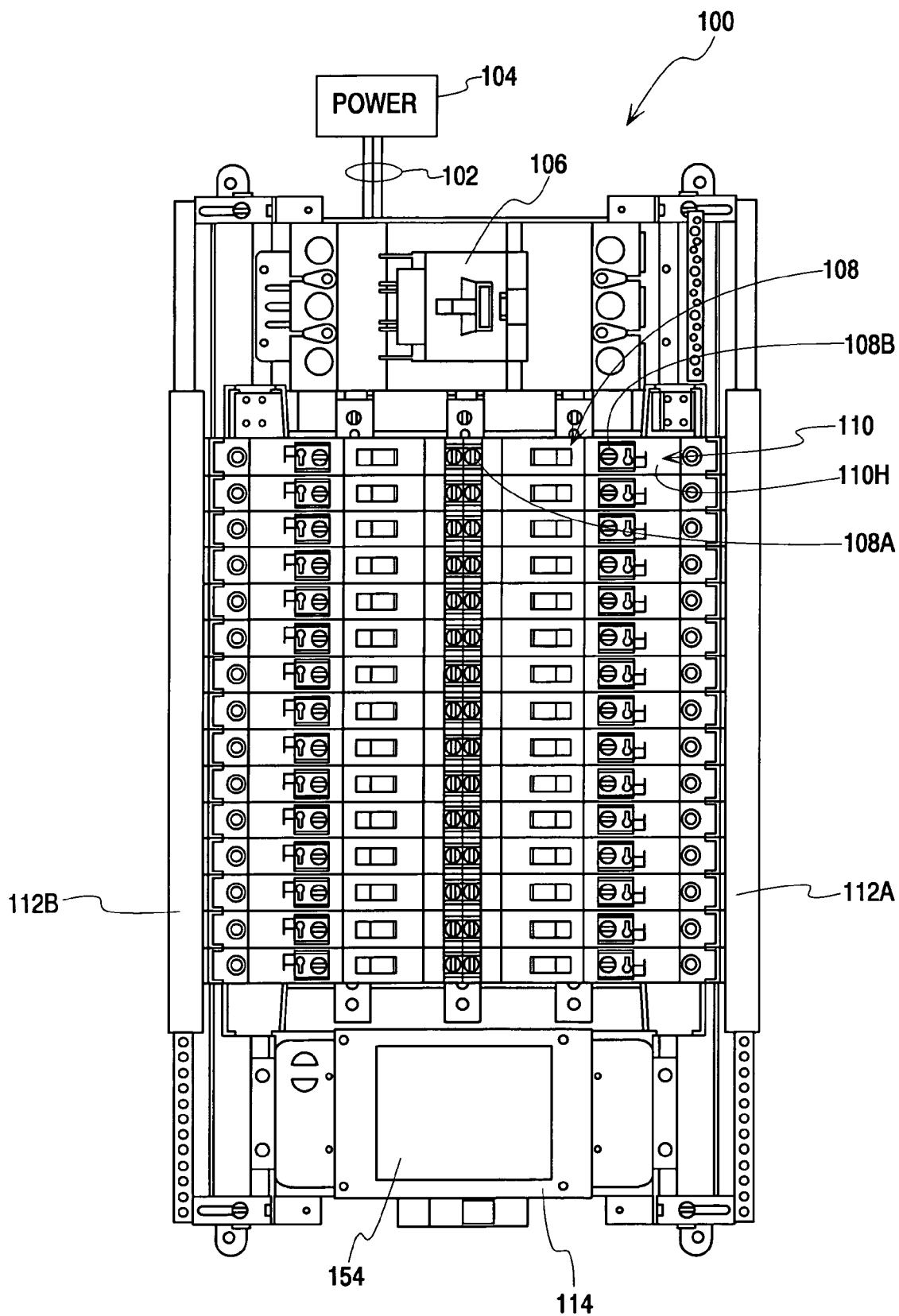
FIG. 1 is an elevation view of a power distribution panel according to the invention.

Referring to FIG. 1, a lighting control system in accordance with the invention comprises a lighting control panel 100. The panel 100 may comprise a Siemens type P1 panelboard, although the invention is not limited to such a configuration. Line power enters the panel 100 through power source cables 102 connected to a source of power 104. Line power may, for example, be a three phase 480Y277, 240 or 120 VAC power source, as is conventional. The cables 102 are electrically connected to an input side of a main breaker 106. The main breaker 106 distributes line power to individual circuit breakers 108 in a conventional manner. How the power is distributed depends on design of the individual circuit breakers 108, as will be apparent to those skilled in the art. The power is distributed to the line side of individual circuit breakers 108. The panel 100 may be configured to accept up to forty-two individual circuit breakers 108, although only thirty are shown in the embodiment of FIG. 1. Each circuit breaker may be of conventional construction and may be, for example, a Siemens BQD circuit breaker. Each circuit breaker 108 includes a line terminal 108A receiving power from the main breaker 106 and a load terminal 108B conventionally used for connecting to a load circuit.

For simplicity of description, when a device such as a circuit breaker 108 is described generally herein the device is referenced without any hyphenated suffix. Conversely, if a specific one of the devices is described it is referenced with a hyphenated suffix, such as 108-1.

In accordance with the invention, each load circuit to be controlled also has a remote operated device 110, such as a relay, a meter or a dimmer. The term remote operated device as used herein includes any other devices that controls, monitors or may otherwise be used in a load circuit, in accordance with the invention. While in a preferred embodiment, the remote operated device 110 is a separate component from the circuit breaker 108, the term "remote operated device" as used herein encompasses devices integral with the circuit breaker. The remote operated devices 110 are also connected to data rails 112A and 112B. A panel controller 114 controls the remote operated devices 110 through connections provided via the data rails 112A and 112B, as discussed below.

The remote operated device 110 includes a housing 110H encasing an auxiliary set of contacts that can be remotely operated to open and close a lighting circuit. The device 110 is attached to the load side of a circuit breaker 108 within a panel 100 using a conductor tab, i.e, the terminal 110A, inserted into the breaker lug 108B. The load terminal 110B comprises a lug of the same size as the breaker lug 108B for connecting to a wire to be connected to the load device. The device housing 110H is configured to mount in a Siemens type P1 panelboard, although the invention is not limited to such a configuration.

Figure 2:
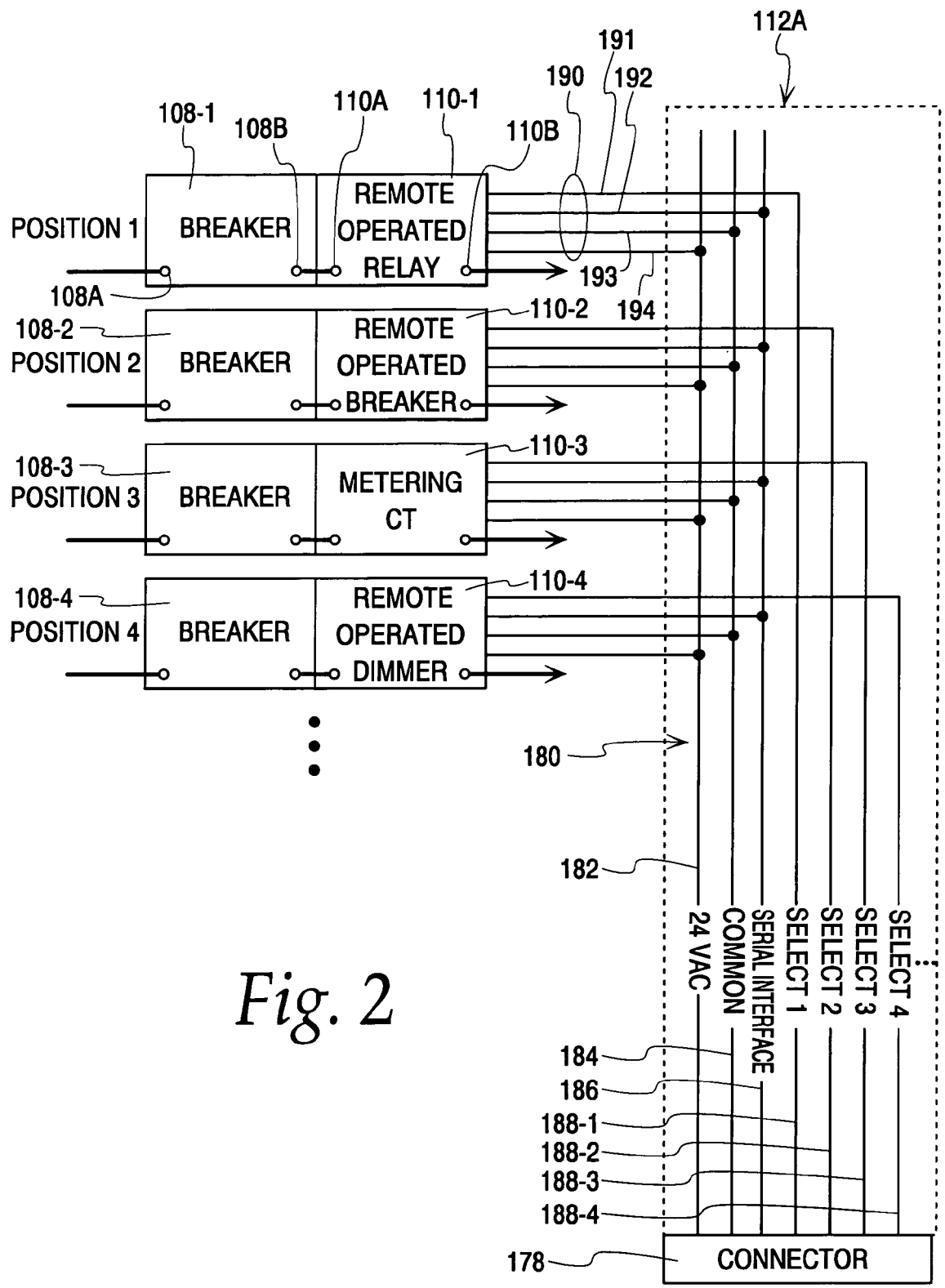
FIG. 2 is a block diagram illustrating pairs of circuit breakers and remote operated devices of the power distribution panel of FIG. 1.

Referring to FIG. 2, a block diagram illustrates four circuit breakers 108-1, 108-2, 108-3 and 108-4, and respective associated remote operated devices 110-1, 110-2, 110-3 and 110-4. In the illustrated embodiment, the first device 110-1 comprises a relay, the second device 110-2 comprises a breaker, the third device 110-3 comprises a current transformer, and the fourth device 110-4 comprises a dimmer. As is apparent, any combination of these remote operated devices 110 could be used. Each remote operated device 110 includes an input terminal 110A electrically connected to the associated circuit breaker load terminal 108B, and an output terminal 110B for connection to a load device.

Figure 3:
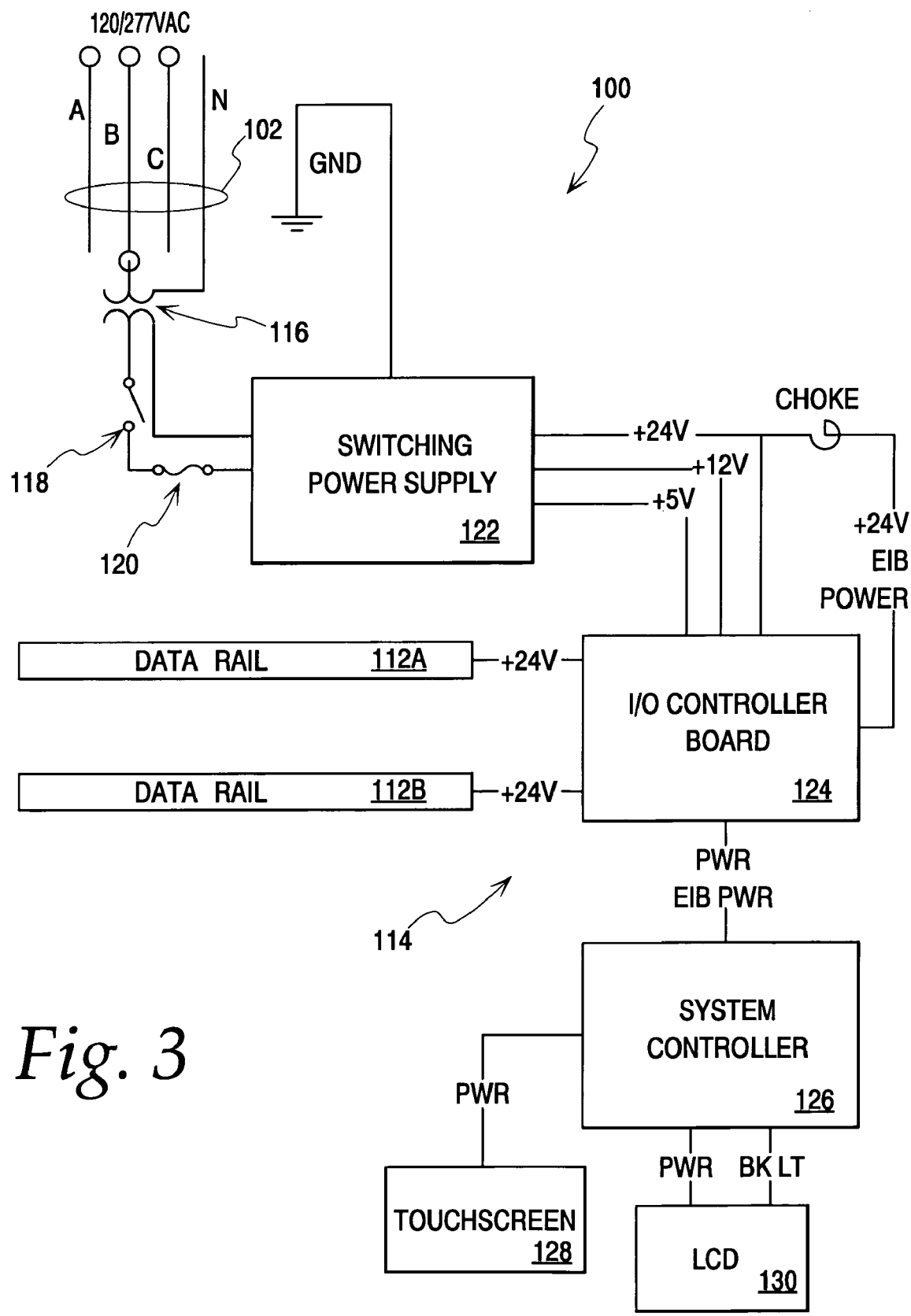
FIG. 3 is a block diagram of the power distribution panel of FIG. 1.

Referring to FIG. 3, a block diagram of the lighting control panel 100 is illustrated. Power from the lines 102 is provided via an isolation transformer 116, power switch 118 and fuse 120 to a switching power supply 122. The panel controller 114 comprises an input/output (I/O) controller 124 and optionally a system controller 126. The power supply 122 provides isolated power to all of the control components including the I/O controller board 124, the system controller 126, and the remote operated devices 110, see FIG. 1, via the data rails 112A and 112B. The I/O controller 124 and system controller 126 each have DC-DC converters deriving regulated DC voltage levels as required from the main DC output of the power supply 122. The power supply 122 also provides 24 volts to the remote operated devices 110. The system controller 126 is operatively connected to a touch screen 128 and an LCD 130.

Figure 4:
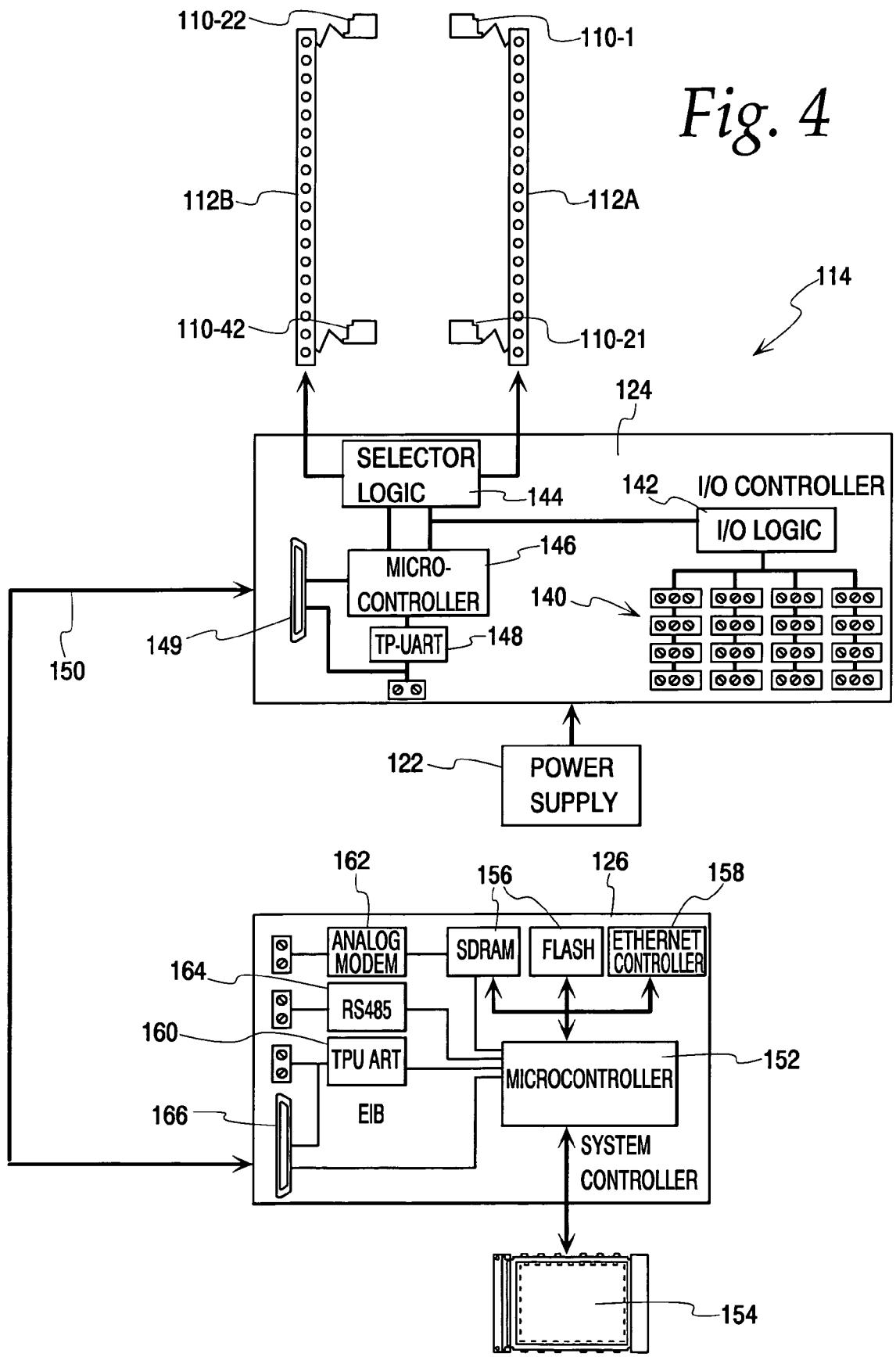
FIG. 4 is an expanded schematic/block diagram of the power distribution panel of FIG. 1.

In one embodiment of the invention, shown in FIG. 4, the panel controller 114 functions as a single panel stand alone system. The I/O controller 124 supplies power and control signals through the rails 112A and 112B to the remote operated devices, four of which, 110-1, 110-21, 110-22 and 110-42, are illustrated. A user interface and high level scheduling and control are provided by the system controller 126.

The I/O controller 124 provides discrete inputs to the controller 114 from dry contact switches, such as wall switches, (not shown) which can be connected to discrete input terminals 140. The terminals 140 are organized as two inputs and a common. The inputs to the terminals 140 are detected by dry contact I/O logic 142. A selector logic block 144 generates selector line signals and serial communications to the remote operated devices 110 via the data rails 112. The logic blocks 142 and 144 are operatively associated with a microprocessor or microcontroller 146. A TP-UART integrated circuit 148 provides an EIB (European Installation Bus) interface. A connector 149 allows mating directly to the system controller 126 via a cable 150.

The system controller 126 provides the user with an application to implement lighting schedules, organize devices into logical groups, manage the inputs, and obtain status information. The system controller 126 includes a microprocessor 152 operatively connected to a user interface 154 in the form of an integrated touch screen 128 and LCD 130, see FIG. 3. The microprocessor 152 is also connected to memory devices 156 and an ethernet controller 158. A TP-UART circuit 160 provides an EIB interface while additional interfaces are provided via an analog modem 162 and RS485 interface circuit 164. A connector 162 is provided for connection to the cable 150.

Figure 5:
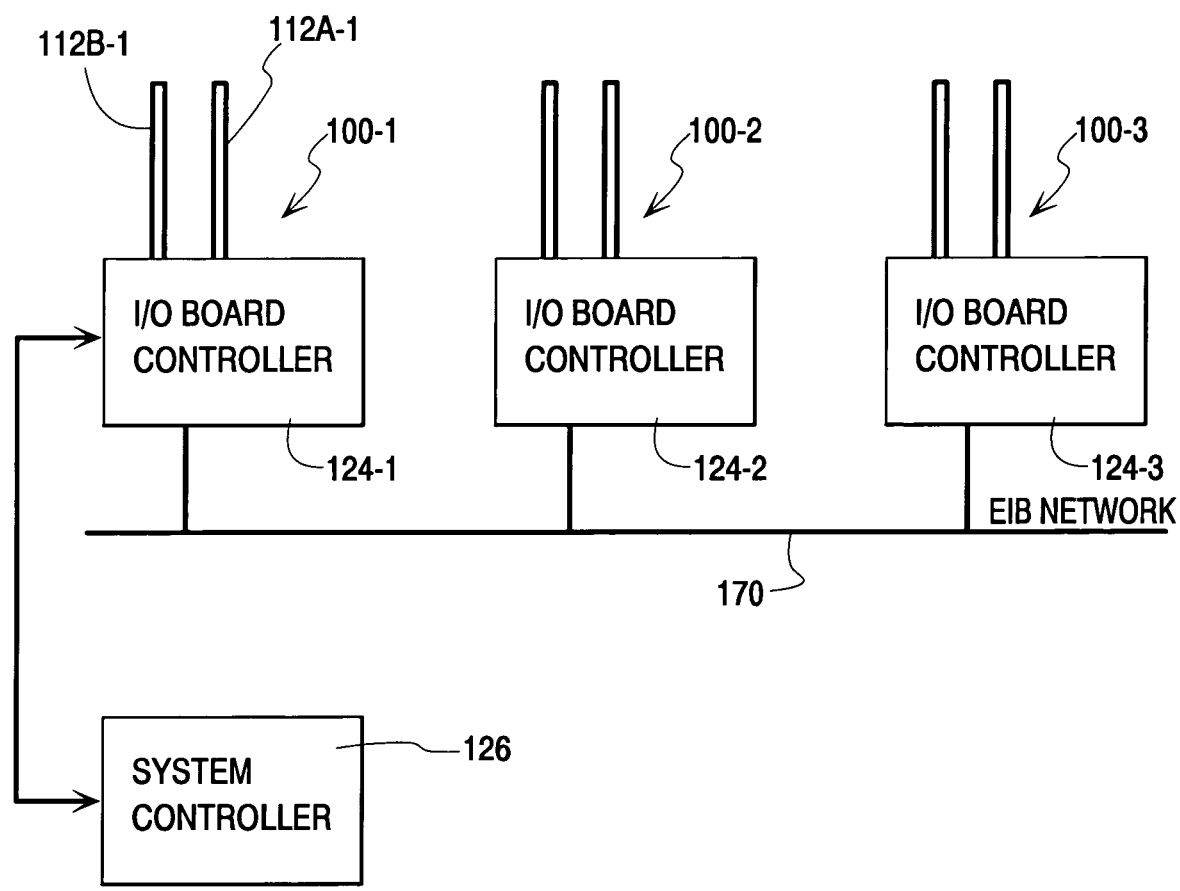
FIG. 5 is block diagram of a multiple panel system in accordance with the invention.

In another embodiment, shown in FIG. 5, multiple lighting control panels 100-1, 100-2 and 100-3 are configured to work as a single unit with the first panel 100-1 being configured as a master, and the other panels 100-2 and 100-3 configured as slaves. To configure the first panel 100-1 as a master, the system controller 126 is used, as described above relative to FIG. 4. The slave panels 100-2 and 100-3 contain no system controller. Instead, an EIB bus 170 interconnects the I/O controller boards 124-1, 124-2 and 124-3 to receive commands from the system controller 126.

Referring again to FIG. 2, a data rail 112 is illustrated schematically. The data rail 112 is mechanically attached directly to the interior of the lighting control panel 100. The data rail 112 comprises a shielded communication bus including a ribbon connector 178 having twenty-five to twenty-nine wires to be routed to the I/O controller board 124. The ribbon connector 178 typically has twenty-six wires, two for power connection, two for ground connection, one for the serial line and up to twenty-one select lines, one for each remote operated device 110. Each data rail 112 provides a barrier to isolate the class 1 load wires from the class 2 signal wires used to manage the devices 110. The data rails 112 will connect to each device 110 via a connector that extends out of the device 110. The wires are connected to a printed circuit board 180 included traces defined as follows. A power trace 182 provides 24 volt DC power to each remote operated device 110. A common trace 184 provides a ground to each remote operated device 110. A serial interface trace 186 provides serial communication to each of the remote operated devices 110. A plurality of select line traces, four of which 188-1, 188-2, 188-3 and 188-4 are illustrated, are provided, one for each remote operated device 110. Each remote operated device 110 includes a four wire cable 190 for connection to the data rail 112. The four wires comprise a select line 191 connected to one of the select traces 188, a serial interface line 192 connected to the serial interface trace 186, a neutral wire 193 connected to the common trace 184 and a power wire 194 connected to the power trace 182.

In accordance with the invention, a unique select line is assigned to each breaker 108/remote operated device 110 pair positioned within the lighting control panel 100. Select lines are used by the I/O controller 124 to select single remote operated devices to communicate via the serial interface trace 186. For example, when the first select line 188-1 is asserted, the first remote operated device 110-1 listens for messages on the serial interface line 186. Conversely, messages on the serial interface 186 are ignored if the first select line 188-1 is not asserted. A response by any of the remote operated devices 110 to a serial command is therefore conditional on whether its particular select line is asserted. The term "asserted", as used herein, means one state of a signal designated to cause the remote operated device to listen for messages. In a preferred embodiment, the select line has "high" and "low" states, the high state being the asserted state.

The remote operated device 110, in the form of a relay, allows remote switching of an electrical branch load. The device 110 is designed to fit inside a standard electrical panel board with up to forty-two branch circuit breakers 108. The device 110 is an accessory to a branch circuit breaker 108 allowing repetitive switching of the load without effecting operation of the circuit breaker 108.

Communications between the system controller 126 and I/O controllers 124 is implemented using a modified version of the European Installation Bus (EIB) protocol. The software in the system controller 126 implements an EIB stack. The EIB stack translates logical EIB messages (requests) into a physical message sent out on the EIB bus 170, except that the physical layer (the lowest layer) of the stack is implemented in an EIB Kernel Driver, for critical timing purposes. The EIB protocol stack implementation for the panel controller 114 is modeled directly from the protocol definition documents as published by Konnex. The most significant deviation from the documentation will be the interface between the layers. The EIB stack implementation follows the ISO Open System Interconnection standard, basic reference model for communications protocols. Layers 5 and 6 of the ISO model, the Session Layer and the Presentation Layer, are not implemented in the EIB implementation in accordance with the invention. The implemented layers provide this functionality. A diagram illustrating the implemented layers is shown in FIG. 6.

The software is developed in C# to take advantage of the net framework to be included in the panel controller platform. The intention is to make this compatible to both Net Framework and .Net Compact Framework. The disclosed implementation will be able to operate in a full duplex mode with the EIB physical bus 170 and be able to service multiple requests concurrently. In order to support this each layer will execute on its own thread. Instead of function calls serving as the interface each layer will communicate to the other via objects passed in queues to the adjacent layers. To remain consistent with the handbook documentation each object has an enumerated member which is equal to the function name in the documentation.

Figure 7:
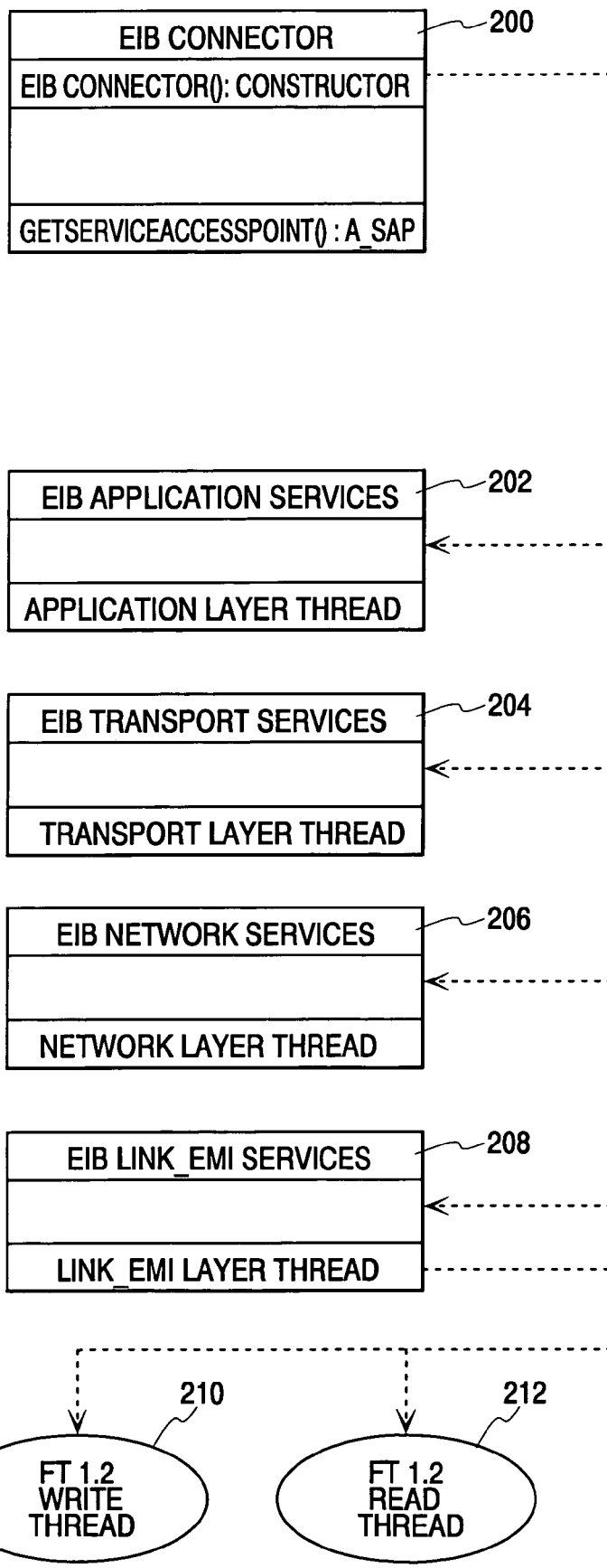
FIG. 7 is a flow diagram illustrating EIB stack creation.

Referring to FIG. 6, EIB layer 7 comprises an Application Layer. There is a single object instantiated by the application which requires the EIB protocol support. This object instantiation will create a "singleton" object which all threads of the application will access to provide the service. The term Singleton in this case is similar to the concept found in .net Remoting, except a communication channel to a remote service provider is not established. What is the same is that a single instantiation of the object will serve all requests. Referring to FIG. 7, when this object is created, referred to as an EIB Connector object 200, it will create each layer object and start four separate threads in each, one for each layer of the protocol stack, namely Application (EIB layer 7) 202, Transport (EIB layer 4) 204, Network (EIB layer 3) 206, and Link/EMI (EIB layer 2) 208. The Link/EMI Layer thread in turn starts two helper threads, a Write thread 210 and a Read thread 212, which provide an interface to an FT 1.2 driver 240, discussed below.

The Application layer 202 also creates all the Q objects and provide references to each layer for accessing the queues. The queues provide mutual exclusion access protection to the underlying collection.

Referring to FIG. 8, the singleton EIB Connector object 200 initially created provides a method to the general application through which the application is provided EIB services. This method will provide the application a reference to a new object call an A_Sap or Application Service Access Point 214. This object will provide methods which provide all the Application layer services required by a User layer, represented by a User Application 216.

Figure 9:
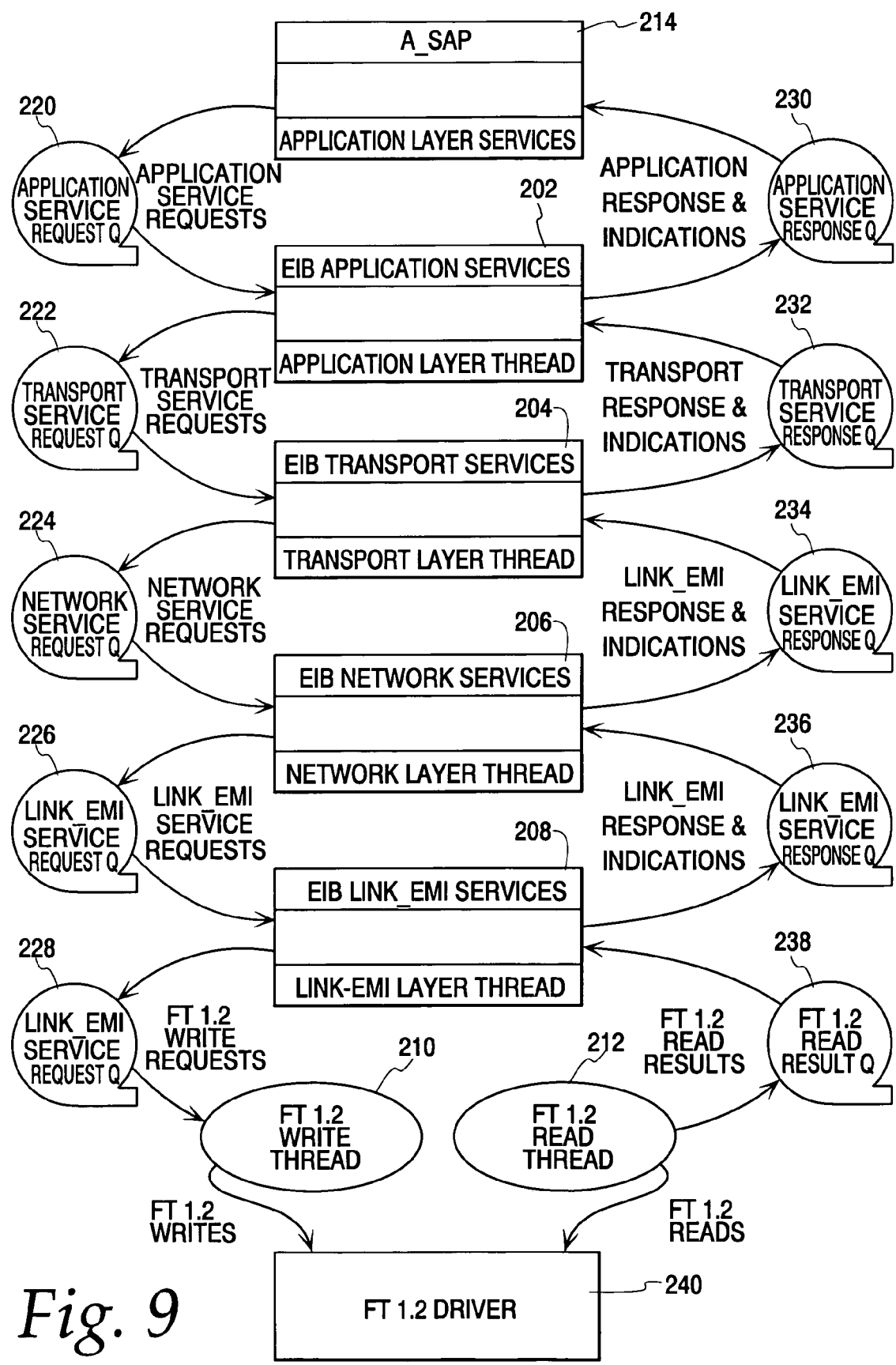
FIG. 9 is a flow diagram illustrating message queuing between EIB stack layers.

Referring to FIG. 9, message queuing between service layers is illustrated. The layer objects are illustrated in column form in the center. Flow to the left side illustrates requests between adjacent layers while flow to the right side illustrates responses between adjacent layers.

The A_Sap object 214 places a service request object onto a queue 220 for the Application layer 202 to process. Responses are returned via a response queue 230. The Application layer 202 will build a protocol data unit from the parameters provided, perform validation and post a service request object onto a queue 222 to the Transport layer 204. The Application layer 202 maintains an object to track this request to insure that all expected responses are received, via a response queue 232, and that the response to the request does not time out. A single request can receive several responses, an Ack/Nak from the local transport layer 204, and response from the local Bus Access Unit, and an Ack/Nak from the remote device as well as a response. The object used to track the requests progress will maintain a list of the expected responses and compare resulting responses to this list. On an unexpected response or Nak the request will be terminated.

The User layer 216, see FIG. 7, can make either synchronous or asynchronous requests. When the request is completed on a synchronous request, the method called will return. For the case of an asynchronous request a synchronizing method provided shall wait on an event. When the request completes the event will be signaled.

The Transport layer 204 provides data transmission over different communication modes. These modes connect the Transport layer 204 users with each other. The Transport layer 204 provides four different communication modes:
    point-to-multipoint, connection-less (multicast)
    point-to-all-points, connection-less (broadcast)
    point-to-point, connection-less
    point-to-point, connection-oriented The Transport layer 204 determines the type of the communication from the address reference in the Transport Layer Service Request. If the reference is to a group address then the service is a point-to-multipoint, connection-less (multicast) request. If the reference is to a null group address then the service is a point-to-all-points, connection-less (broadcast) request. If the reference is to an individual device address and the service does not require a connection the mode is obviously a point-to-point, connection-less service. And finally if the reference is to an individual device address and the service does require a connection it is a point-to-point, connection-oriented service. The primary role of the Transport layer 204 is to manage these connections. If a request for a connection oriented service is made and no connection has been established then the Transport layer 204 will establish the connection before processing the request from the Application layer 202. The Transport layer 204 will maintain this connection in a Connection pool for subsequent connection oriented requests using this connection. The Transport layer 204 will provide a timeout feature which may end the connection after, for example, three minutes of inactivity or unless specifically requested to terminate it. If the A_Sap object 214 which established the connection is disposed the connection will be closed.

The Transport layer 204 receives requests from the Application layer 202 via the queue 222. The Transport layer 204 will pass along transport layer requests to the Network layer 206 via a queue 224. The Transport layer 204 will receive indications and responses from the EIB Network layer 206 via a response queue 234 and return its indications and responses to the Application layer via the response queue 232.

The Network layer 206 has little functionality but to manage the hop count. The network layer has a much larger role when performing the services of a Router or Bridge. As above, requests come from the Transport layer 204 via a queue 224 and are passed along to the Link/EMI layer 208 via a queue 226. All indications and responses from the Link/EMI layer 208 are passed up to the Network layer 206 via a queue 236 as well as indications and responses from the Network layer 206 are passed up to the Transport layer 204 via a queue 234.

Figure 10:
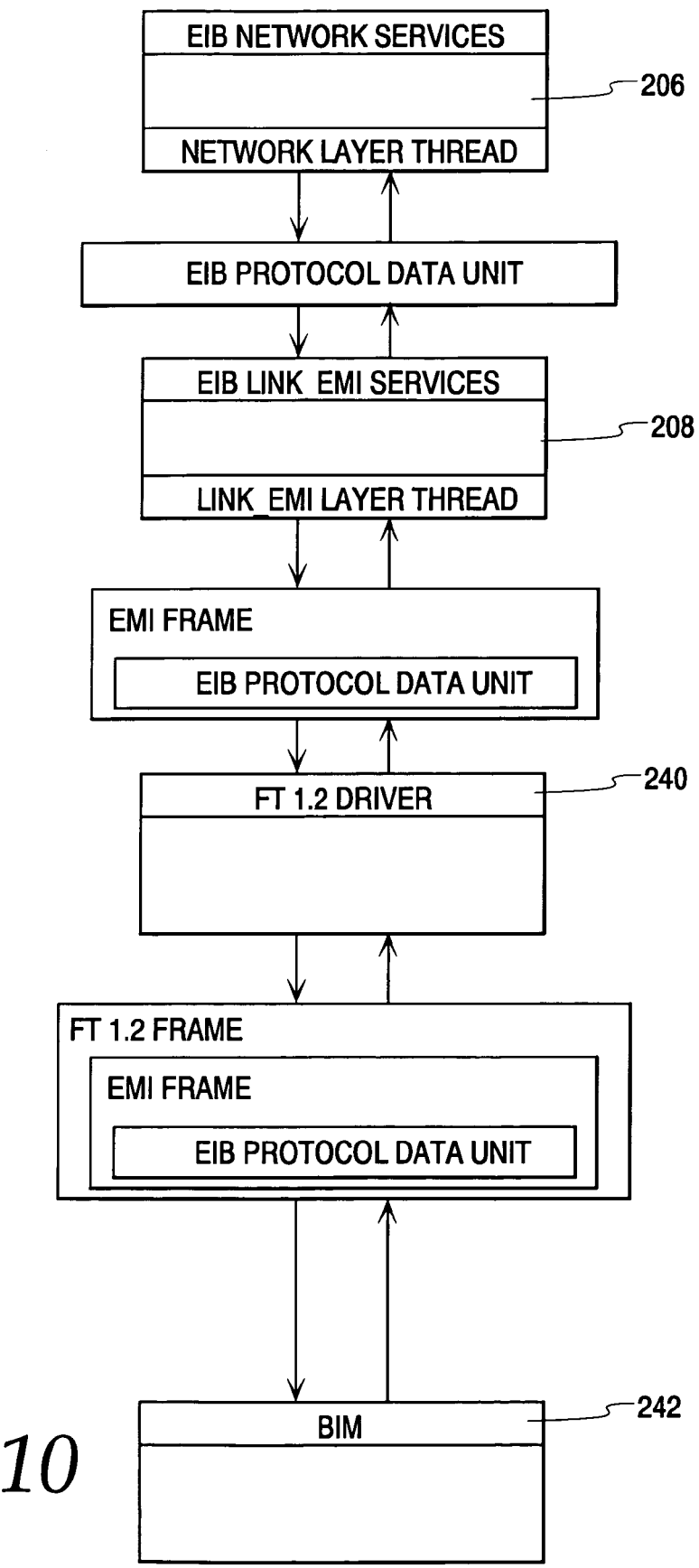
FIG. 10 is a flow diagram illustrating data encapsulation at link driver levels.

With respect to the Link/EMI layer 208, the interface to the EIB bus 170 is a Bus Interface Module (BIM) 242, see FIG. 10. The interface to the BIM is a serial interface running a protocol called FT 1.2. This protocol is a Link Layer protocol which simply packages up and receives messages for transmission to the BIM 242 and ensures that they were not corrupted. An operating system driver performs the function of encapsulating the messages from the EIB Protocol stack into FT 1.2 datagram's and transmitting and receiving them back and forth from the BIM 242. The BIM 242 is configured via hardware to operate in Physical External Interface mode Type 10. This Physical interface is not to be confused with Physical layer of the EIB bus 70 but is an interface through which the Application and User Layer of the BIM 242 access its environment. In Type 10, the interface is a serial asynchronous interface running at 19.2 KBaud. It implements FT 1.2 as a Link Layer protocol. EMI, or External Message Interface, is a definition of how EIB Bus content is transferred via Physical interfaces. In this implementation of the EIB Protocol stack, what would normally be the Data Link Layer will implement the EMI specification for servicing request it receives from the Network layer 206 as well as indications and responses from the EIB Bus 170. The EIB stack interface to the BIM 242 will be via the FT 1.2 operating system driver 240.

An important component of the EMI protocol is its ability to manage the operation of the EIB Protocol layers in the BIM 242. This allows the EIB communication interface to interrogate and configure the BIM 242 locally as well as other EIB devices which are accessed remotely via the EIB Bus 170. This Link/EMI layer 208 of the protocol stack will manage and maintain the configuration of the EIB Protocol layers in the BIM 242. The EMI specification has specific messages to perform this function.

The Link/EMI layer 208 creates the two helper threads 210 and 212 which interface with the FT 1.2 driver 240 and keep the paradigm of two queues 226 and 236 for messages flowing from the Network layer 206 through the Link/EMI layer 208 to the physical interface and two queues 228 and 238 for message flowing up from the FT 1.2 driver 240 through the Link/EMI layer 208 on up to the Network layer 206. There is one thread which performs all the transmitting of messages from the output queue 228 via the FT 1.2 driver 240 and another thread which receives messages from the FT 1.2 driver and places them on the input queue 238.

Thus, in accordance with the invention, an integrated electrical power distribution system, such as a lighting control system, includes a system controller communicating with I/O controllers using a modified EIB stack. In the modified EIB stack each layer will execute its own thread and communicate via objects passed in queues to adjacent layers.

The present invention has been described with respect to flowcharts and block diagrams. It will be understood that each block of the flowchart and block diagrams can be implemented by computer program instructions. These program instructions may be provided to a processor to produce a machine, such that the instructions which execute on the processor create means for implementing the functions specified in the blocks. The computer program instructions may be executed by a processor to cause a series of operational steps to be performed by the processor to produce a computer implemented process such that the instructions which execute on the processor provide steps for implementing the functions specified in the blocks. Accordingly, the illustrations support combinations of means for performing a specified function and combinations of steps for performing the specified functions. It will also be understood that each block and combination of blocks can be implemented by special purpose hardware-based systems which perform the specified functions or steps, or combinations of special purpose hardware and computer instructions.

We claim:

1. A method of communicating messages in an integrated power distribution system, comprising:

providing a panel comprising a plurality of load control devices each for connection in a branch circuit to a load, and a single I/O controller operatively connected to each of the load control devices in the panel, the I/O controller comprising a controller for controlling operation of the load control devices and a communication port for message communication, the load control devices including a circuit breaker and a remote operated device, wherein the remote operated device includes an input terminal electrically connected to a load terminal of the circuit breaker and an output terminal for connection to a load device so the remote operated device can be coupled between the circuit breaker and a load device;

providing a programmed system controller for controlling operation of the I/O controller and including a communication port for message communication;

operatively connecting the I/O controller communication port to the system controller communication port via a bus; and the system controller implementing a protocol establishing communications on the bus, the protocol including a layer stack translating between logical messages and physical messages for communication on the bus, wherein each layer generates its own thread and communicates to other layers via objects passed in queues to adjacent layers.

2. The method of claim 1 wherein the layer stack comprises an application layer, a transport layer, a network layer and a link layer.

3. The method of claim 1 wherein the layer stack comprises an application layer which is adjacent a transport layer which is adjacent a network layer and which is adjacent a link layer.

4. The method of claim 1 wherein the layer stack comprises an application layer providing an interface to user applications.

5. The method of claim 1 wherein the layer stack comprises a transport layer providing data transmission over different communication modes.

6. The method of claim 5 wherein the communication modes comprise: point-to-multipoint, connection-less (multicast); point-to-all-points, connection-less (broadcast); point-to-point, connection-less; and point-to-point, connection-oriented.

7. The method of claim 1 wherein the layer stack comprises a link layer for coding and decoding messages to and form the bus.

8. The method of claim 7 wherein the link layer communicates with the bus through a serial interface driver.

9. A method of communicating messages in an integrated power distribution system, comprising:

providing a plurality of panels, each panel comprising a plurality of load control devices each for connection in a branch circuit to a load, and a single I/O controller in each panel operatively connected to each of the load control devices of a respective panel, the I/O controllers each including a controller for controlling operation of the load control devices and a communication port for message communication, wherein the load control devices include a circuit breaker and a remote operated device and wherein the remote operated device includes an input terminal electrically connected to a load terminal of the circuit breaker and an output terminal for connection to a load device so the remote operated device can be coupled between the circuit breaker and a load device;

providing a programmed system controller for controlling operation of the I/O controllers and including a communication port for message communication;

operatively connecting the I/O controller communication ports to the system controller communication port via a bus; and the system controller implementing a protocol establishing communications on the bus, the protocol including a layer stack translating between logical messages and physical messages for communication on the bus, wherein each layer generates its own thread and communicates to other layers via objects passed in queues to adjacent layers.

10. The method of claim 9 wherein the layer stack comprises an application layer, a transport layer, a network layer and a link layer.

11. The method of claim 9 wherein the layer stack comprises an application layer which is adjacent a transport layer which is adjacent a network layer and which is adjacent a link layer.

12. The method of claim 9 wherein the layer stack comprises an application layer providing an interface to user applications.

13. The method of claim 9 wherein the layer stack comprises a transport layer providing data transmission over different communication modes.

14. The method of claim 13 wherein the communication modes comprise: point-to-multipoint, connection-less (multicast); point-to-all-points, connection-less (broadcast); point-to-point, connection-less; and point-to-point, connection-oriented.

15. The method of claim 9 wherein the layer stack comprises a link layer for coding and decoding messages to and form the bus.

16. The method of claim 15 wherein the link layer communicates with the bus through a serial interface driver.

17. An electrical distribution system for selectively connecting an electrical power source to load devices, comprising:

a plurality of panels, each panel comprising a plurality of load control devices each for connection in a branch circuit to a load device, and a single input/output (I/O) controller in each panel operatively connected to each of the load control devices of a respective panel for controlling operation of the load control devices, the I/O controllers each including a communication port, wherein the load control devices include a circuit breaker and a remote operated device and wherein the remote operated device includes an input terminal electrically connected to a load terminal of the circuit breaker and an output terminal for connection to a load device so the remote operated device can be coupled between the circuit breaker and a load device;

a programmed system controller for commanding operation of the I/O controllers and including a communication port; and a bus operatively connecting the I/O controller communication ports to the system controller communication port;

the programmed system controller implementing a communication program using a protocol establishing communications on the bus, the protocol including a layer stack translating between logical messages and physical messages for communication on the bus, wherein each layer generates its own thread and communicates to other layers via objects passed in queues to adjacent layers.

18. The electrical distribution system of claim 17 wherein the layer stack comprises an application layer which is adjacent a transport layer which is adjacent a network layer and which is adjacent a link layer.

19. The electrical distribution system of claim 17 wherein the layer stack comprises an application layer providing an interface to user applications.

20. The electrical distribution system of claim 17 wherein the layer stack comprises a transport layer providing data transmission over different communication modes, wherein the communication modes comprise: point-to-multipoint, connection-less (multicast); point-to-all-points, connection-less (broadcast); point-to-point, connection-less; and point-to-point, connection-oriented.

21. The electrical distribution system of claim 17 wherein the layer stack comprises a link layer communicating with the bus through a serial interface driver.

* * * * *